(12) United States Patent
Shin et al.

(10) Patent No.: US 11,636,515 B2
(45) Date of Patent: Apr. 25, 2023

(54) ELECTRONIC APPARATUS AND CONTROL METHOD THEREOF

(71) Applicants: Samsung Electronics Co., Ltd., Suwon-si (KR); Cheil Worldwide Inc., Seoul (KR)

(72) Inventors: Jaehyuck Shin, Suwon-si (KR); Sanghyo Kim, Suwon-si (KR); Changsoo Moon, Seoul (KR); Kichan Ryu, Suwon-si (KR); Daewon Cho, Suwon-si (KR)

(73) Assignees: Samsung Electronics Co., Ltd., Suwon-si (KR); Cheil Worldwide Inc., Seoul (KR)

(*) Notice: Subject to any disclaimer, the term of this patent is extended or adjusted under 35 U.S.C. 154(b) by 876 days.

(21) Appl. No.: 16/292,741

(22) Filed: Mar. 5, 2019

(65) Prior Publication Data

US 2019/0272560 A1 Sep. 5, 2019

(30) Foreign Application Priority Data

Mar. 5, 2018 (KR) .................. 10-2018-0025891
Nov. 13, 2018 (KR) .................. 10-2018-0139272

(51) Int. Cl.
*G06Q 30/0251* (2023.01)
*G06N 3/08* (2023.01)
(Continued)

(52) U.S. Cl.
CPC ......... *G06Q 30/0254* (2013.01); *A63F 13/25* (2014.09); *A63F 13/61* (2014.09);
(Continued)

(58) Field of Classification Search
CPC ............ G06Q 30/0254; G06Q 30/0251; A63F 13/25; A63F 13/61; A63F 2300/30;
(Continued)

(56) References Cited

U.S. PATENT DOCUMENTS 6,582,301 B2 * 6/2003 Hill .................. G07F 17/3293
463/47
7,523,411 B2 4/2009 Carlin
(Continued)

FOREIGN PATENT DOCUMENTS

KR 10-2001-087851 A 9/2001
KR 10-2009-9000242 A 1/2009
(Continued)

OTHER PUBLICATIONS

Korean Office Action dated Nov. 20, 2020, issued in Korean Patent Application No. 10-2018-0139272.
(Continued)

*Primary Examiner* — Alexandru Cirnu
(74) *Attorney, Agent, or Firm* — Jefferson IP Law, LLP

(57) ABSTRACT

An electronic device is provided. The electronic device includes a display, a communicator, and a processor configured to recognize a context in a game which is running in the electronic device, receive an advertisement content from an external server through the communicator, modify the received advertisement content based on the context, and control the display to display a game screen in which the modified advertisement content is inserted.

16 Claims, 16 Drawing Sheets

(51) Int. Cl.
*G06N 3/04* (2023.01)
*G09G 5/00* (2006.01)
*A63F 13/25* (2014.01)
*A63F 13/61* (2014.01)

(52) U.S. Cl.
CPC .............. *G06N 3/04* (2013.01); *G06N 3/08* (2013.01); *G06Q 30/0251* (2013.01); *G09G 5/003* (2013.01); *A63F 2300/30* (2013.01); *A63F 2300/5506* (2013.01); *G09G 2354/00* (2013.01)

(58) Field of Classification Search
CPC ... A63F 2300/5506; A63F 13/79; G06N 3/04; G06N 3/08; G06N 3/0445; G06N 3/0454; G06N 5/022; G09G 5/003; G09G 2354/00
See application file for complete search history.

(56) References Cited

U.S. PATENT DOCUMENTS

| | | | |
|---|---|---|---|
| 8,328,640 | B2 | 12/2012 | Rom et al. |
| 8,715,077 | B2* | 5/2014 | Paradise ............... A63F 13/12 463/31 |
| 9,047,609 | B2* | 6/2015 | Ellis ................ G06Q 30/0267 |
| 9,373,213 | B1* | 6/2016 | Archer ................ G07F 17/32 |
| 2006/0085261 | A1 | 4/2006 | Chu |
| 2006/0105841 | A1 | 5/2006 | Rom et al. |
| 2007/0072676 | A1 | 3/2007 | Baluja |
| 2007/0088852 | A1 | 4/2007 | Levkovitz |
| 2010/0036729 | A1* | 2/2010 | Hamilton, II ...... G06Q 30/0251 705/14.49 |
| 2010/0177117 | A1 | 7/2010 | Finn et al. |
| 2010/0323799 | A1 | 12/2010 | Lee et al. |
| 2012/0259712 | A1 | 10/2012 | Hyndman et al. |
| 2012/0264511 | A1 | 10/2012 | Marsland et al. |
| 2012/0264520 | A1* | 10/2012 | Marsland ............... A63F 13/61 463/43 |
| 2013/0124311 | A1 | 5/2013 | Sivanandan et al. |
| 2013/0278734 | A1 | 10/2013 | Yang et al. |
| 2013/0311308 | A1 | 11/2013 | Huang |
| 2014/0364202 | A1* | 12/2014 | Harms .................. A63F 13/69 463/29 |
| 2015/0199078 | A1* | 7/2015 | Pidhajecky .......... G06F 3/0484 715/760 |
| 2016/0042648 | A1* | 2/2016 | Kothuri ................ G06K 9/6289 434/236 |
| 2017/0282063 | A1* | 10/2017 | Krishnamurthy ....... A63F 13/69 |
| 2018/0165701 | A1* | 6/2018 | Onda ..................... A63F 13/69 |
| 2018/0178127 | A1* | 6/2018 | Okamura ............... A63F 13/35 |
| 2019/0065911 | A1* | 2/2019 | Lee ......................... G06V 10/82 |
| 2019/0291008 | A1* | 9/2019 | Cox .......................... G06N 3/08 |
| 2019/0355209 | A1* | 11/2019 | Sorey .................... G07F 17/34 |

FOREIGN PATENT DOCUMENTS

| | | |
|---|---|---|
| KR | 10-2009-0085849 A | 8/2009 |
| KR | 10-1168108 B1 | 7/2012 |

OTHER PUBLICATIONS

Korean Office Action dated Apr. 29, 2020, issued in Korean Patent Application No. 10-2018-0139272.
Extended European Search Report dated Mar. 30, 2021, issued in European Patent Application No. 19764819.9.
Korean Office Action dated May 28, 2021, issued in Korean Patent Application No. 10-2018-0139272.
International Search Report dated May 21, 2019, issued in International Patent Application No. PCT/KR2019/001650.
European Examination Report dated Sep. 23, 2022, issued in European Patent Application No. 19764819.9.

* cited by examiner

ELECTRONIC APPARATUS AND CONTROL METHOD THEREOF

CROSS-REFERENCE TO RELATED APPLICATIONS

This application is based on and claims priority under 35 U.S.C. § 119(a) of a Korean patent application number 10-2018-0025891, filed on Mar. 5, 2018 and a Korean patent application number 10-2018-0139272, filed on Nov. 13, 2018, in the Korean Intellectual Property Office, the disclosure of which is incorporated by reference herein in its entirety.

BACKGROUND

1. Field

The disclosure relates to an electronic device and a controlling method thereof. More particularly, the disclosure relates to an electronic device which is capable of providing an advertisement in a game and a controlling method thereof.

The disclosure pertains to an artificial intelligence (AI) system which copies recognition and determination of a human brain using machine learning algorithm, and an application thereof.

2. Description of Related Art

Currently, digital advertising market shows a trend that it has been changed from an existing method to expose a specific advertisement on a specific location to a real-time bidding (RTB) system that exposes advertisements on a real-time basis so that advertisements suit the characteristics of an area to which advertisements are exposed and viewers viewing advertisements.

In recent years, in-game object type advertisements in which advertisements are provided in the form of three-dimensional (3D) objects appearing naturally in the game are emerging. However, since the object type advertisement in the game is intended to be applied to a game player in the game without a sense of difference, the advertisement must be subjected to the pre-production process according to the scene, background, environment and thus, there is a problem that it is difficult to apply the aforementioned RTB system.

Accordingly, in the related art, various versions of advertisement contents corresponding to the atmosphere, background, and situation of each scene in the game are produced, and when an advertisement is requested by a game client such as a mobile device, the advertisement to be displayed is selected by analyzing the metadata, and the selected advertisement is rendered in a 3D object in the game and displayed.

However, such a method has a problem in that one advertisement must be produced in advance by various versions of advertisements corresponding to the background, situation, etc. of each scene. In addition, if the background, situation, and so on of each scene cannot be reflected due to an event that is not considered in the pre-production stage, an advertisement which does not match the produced advertisement in terms of a historical background of the game and so on is displayed in the game and there would be a problem of reducing an advertisement effect due to heterogeneity in the advertisement.

Therefore, there is a need to develop a technique for automatically recognizing and analyzing the situation, background, and environment of a game by applying the RTB system to the in-game object type advertisement, and reconstructing the advertisement without any heterogeneity.

In the meantime, the necessity of the technical can be approached in terms of the artificial intelligence (AI).

AI system is a computer system that implements human-level intelligence. It is a system, unlike the existing rule-based smart system, that a machine learns, judges and becomes smart. As the use of AI improves recognition rate and understanding of user's taste more accurately, existing rule-based smart systems are gradually being replaced by deep learning-based AI systems.

AI is composed of machine learning (deep learning) and element technology utilizing machine learning.

Machine learning is an algorithm technology that classifies/learns the characteristics of input data by itself. Element technology is a technology that uses machine learning algorithms such as deep learning, composed of technical fields such as linguistic understanding, visual understanding, inference/prediction, knowledge representation, and motion control, and the like.

The various fields in which AI technology is applied are as follows. Linguistic understanding is a technology for recognizing, applying/processing human language/characters and includes natural language processing, machine translation, dialogue system, question and answer, speech recognition/synthesis, and the like. Visual understanding is a technique to recognize and process objects as human vision, including object recognition, object tracking, image search, human recognition, scene understanding, spatial understanding, and image enhancement. Inference/prediction is a technique for judging and logically inferring and predicting information, including knowledge/probability based reasoning, optimization prediction, preference-based planning, and recommendation. Knowledge representation is a technology for automating human experience information into knowledge data, including knowledge building (data generation/classification) and knowledge management (data utilization). The motion control is a technique for controlling the autonomous running of the vehicle and the motion of the robot, and includes motion control (navigation, collision, running), operation control (behavior control).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device which analyzes a scenario, a background, a situation (story, level, etc.) of various games which are not fixed, modifies an object-type advertisement in a game on a real-time basis, and displays the same and a controlling method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a display, a communicator, and a processor configured to recognize a context in a game, which is running in the electronic device, control the communicator to receive an advertisement content from an external server, modify the received advertisement content based on the context, and control the display to display a game screen in which the modified advertisement content is inserted.

The processor may control the communicator to transmit information relating to the context to the external server and receive, from the external server, an advertisement content which is selected based on the context.

The processor may control the display to display the modified advertisement content in a three-dimensional (3D) object format at a preset position in a layout of a game screen.

The context may include at least one of development of a story within the game, information of progress of the game, difficulty level, time and space information of the game, a peripheral object, player profile information, or game character profile information.

The processor may calculate metadata representing the context in the game through a hierarchical analysis based on an object included in the game, and modify the advertisement content based on the calculated metadata.

The processor may classify an object included in the game for generating a hierarchical tree and calculate metadata representing a relationship in the hierarchical tree based on a priority of each classified object.

In accordance with another aspect of the disclosure, an electronic device for providing an advertisement is provided. The electronic device includes a communicator, a storage, and a processor configured to control the communicator to receive information related to a context in a game, which is running in an external electronic device, select an advertisement content from among pre-stored plurality of advertisement contents based on the received context and player profile information, and control the communicator to transmit the selected advertisement content to the external electronic device.

The information related to the context may include information regarding the game, which is running in the external electronic device, and information regarding an advertisement area in which the advertisement is to be inserted in the game.

In accordance with another aspect of the disclosure, a controlling method of an electronic device is provided. The controlling method includes recognizing a context in a game, which is running in the electronic device, receiving advertisement content from an external server, modifying the received advertisement content based on the context, and displaying a game screen in which the modified advertisement content is inserted.

The receiving the advertisement content may include transmitting information relating to the context to the external server and receiving, from the external server, the advertisement content which is selected based on the context.

The displaying may include displaying the modified advertisement content in a three-dimensional (3D) object format at a preset position in a layout of the game screen.

The context may include at least one of development of a story within the game, information of progress of the game, difficulty level, time and space information of the game, a peripheral object, player profile information, or game character profile information.

The modifying the received advertisement content may include calculating metadata representing the context in the game through a hierarchical analysis based on an object included in the game, and modifying the advertisement content based on the calculated metadata in real time.

The modifying the received advertisement content may include classifying an object included in the game for generating a hierarchical tree and calculating metadata representing a relationship in the hierarchical tree based on a priority of each classified object.

In accordance with another aspect of the disclosure, a controlling method of an electronic device for providing an advertisement is provided. The controlling method includes receiving information related to a context in a game, which is running in an external electronic device, selecting advertisement content from among pre-stored plurality of advertisement contents based on the received context and player profile information, and transmitting the selected advertisement content to the external electronic device.

The information related to the context may include information regarding the game, which is running in the external electronic device, and information regarding an advertisement area in which the advertisement is to be inserted in the game.

In accordance with another aspect of the disclosure, a system is provided. The system includes a first electronic device, and a second electronic device. The first electronic device is configured to recognize a context in a game, which is running, transmit information related to the context to the second electronic device, receive, from the second electronic device, advertisement content that is selected based on the context, modify the received advertisement content based on the context, and display a game screen in which the modified advertisement content is inserted, and the second electronic device is configured to receive the context from the first electronic device, select the advertisement content from among a plurality of pre-stored advertisement contents based on the received context and player profile information, and transmit the selected advertisement content to the first electronic device.

In accordance with another aspect of the disclosure, a recordable medium in which a program for executing a controlling method of an electronic device is stored is provided. The controlling method includes recognizing a context in a game, which is running in the electronic device, receiving advertisement content from an external server, modifying the received advertisement content based on the context, and displaying a game screen in which the modified advertisement content is inserted.

According to the aforementioned embodiment, based on a result of recognizing situations including a background of a game and an environment and so on, by modifying an advertisement content which is produced as a single content on a real-time basis, and applying the content to a three-dimensional (3D) object, an advertisement which suits diverse situations can be reflected to a game by utilizing the single image even without a necessity to produce individual advertisements for different situations.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
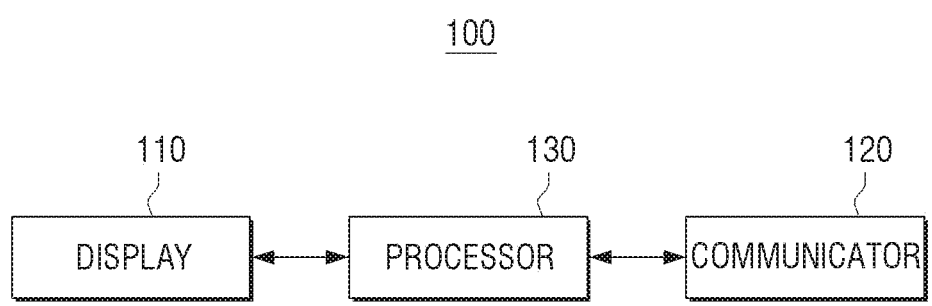
FIG. 1 is a block diagram which briefly illustrates a configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First, the terms used in the Specification and claims have chosen generic terms in view of their function in various embodiments of the disclosure. However, these terms may vary depending on the intentions, legal or technical interpretations of the artisan skilled in the art, and the emergence of new technologies. In addition, some terms may be terms arbitrarily selected by the applicant. These terms may be construed in the meaning defined herein and, unless otherwise specified, may be construed on the basis of the entire contents of this Specification and common technical knowledge in the art.

In the following description, like drawing reference numerals are used for like elements, even in different drawings. The matters defined in the description, such as detailed construction and elements, are provided to assist in a comprehensive understanding of the embodiments. However, it is apparent that the embodiments may be practiced without those specifically defined matters. Also, well-known functions or constructions are not described in detail since they would obscure the description with unnecessary detail.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, operation, element, component, or a combination thereof, and not to preclude a presence or a possibility of adding one or more of other characteristics, numbers, operations, elements, components or a combination thereof.

In the example embodiments of the disclosure, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor.

Further, in the embodiment of the disclosure, when a part is connected to another part, this includes not only a direct connection but also an indirect connection through another medium. Also, the meaning that a part includes an element does not exclude other elements, but may include other elements, unless specifically stated otherwise.

The disclosure will be described in greater detail below with reference to the accompanying drawings.

FIG. 1 is a block diagram which briefly illustrates a configuration of an electronic device according to an embodiment of the disclosure.

Referring to FIG. 1, an electronic device 100 according to an embodiment includes a display 110, a communicator 120, and a processor 130.

The electronic device 100 may be implemented as various electronic devices such as a smartphone, a tablet, a personal computer (PC), and a notebook.

The display 110 is a configuration for providing a game screen to be executed in the electronic device 100. The implementation of the display 110 is not limited. For example, the display can be implemented as various types of displays such as a liquid crystal display (LCD), an organic light emitting diodes (OLED) display, an active-matrix organic light-emitting diode (AM-OLED), a plasma display panel (PDP), and the like. For example, when the display 110 is a liquid crystal type, the display 110 may additionally include an LCD display panel (not shown), a backlight unit (not shown) which supplies light to the display panel, and a panel driving unit (Not shown) for driving a panel.

The communicator 120 is configured to perform communication with an external device according to various types of communication methods. The communicator 120 may receive or transmit data with an external device according to various communication standards such as an infrared communication system, a radio frequency (RF) system, a near field communication (NFC) system, a zigbee system, a digital living network alliance (DLNA) system, a Wi-Fi system, Bluetooth, long term evolution (LTE) and the like, according to various communication standards. Alternatively, the communicator may be connected to a wired/wireless network including an Internet network to transceive data with an external device.

The communicator 120 may include various communication chips such as a Wi-Fi chip, a Bluetooth chip, and a wireless communication chip to perform communication according to the above-described communication method with an external device and communicate with external electronic device including a server using the chips. The communicator 150 may include a wired communication chip, a wired communication terminal, or the like for performing communication with an external device through a wired communication system.

The processor 130 is a configuration for controlling the overall operation of the electronic device 100. The electronic device 100 can receive advertisement contents (hereinafter referred to as AD contents) from an external server (AD server) 200 through the communicator 120, and the processor 130 may insert the AD contents received in the game which is being executed in the electronic device 100 and display the same. At this time, the processor 130 may recognize the context in the game, and can display the advertisement by modifying the content based on the recognized context.

Here, the context refers to progress information and situation information related to the game, player (user) information, and the like. Specifically, the context may include various information such as story development in the game, progress information of the game, difficulty of the game, time and space information of the game, an object displayed around the advertisement area where the advertisement is to be inserted, profile information related to the gender, age, connection area, etc. of the player, and profile information of the player's game character and the like.

Therefore, not only the AD content is inserted and displayed in the advertisement area included in each scene of the game screen, but also, the AD content can be modified and inserted in reflection of the atmosphere of the object or the game displayed around the advertisement area, and an emotion state of a player according to a progress of a game and the like.

The advertisement area may be a predetermined area which is at a specific position on a layout of each scene of a game by a game developer. In case of a three-dimensional (3D) game, a modified AD content can be displayed in a form of a 3D object at a corresponding advertisement area.

An in-game AD module for receiving, modifying and inserting the AD content is included in the game content, and the processor 130 controls the in-game AD module, and may receive the AD content from the AD server 200 communicating with the electronic device 100, modify the received AD content based on the recognized context in the game, and insert the modified AD content into a predetermined advertisement area in each scene of the game screen.

The in-game AD module may include, as sub-modules, a context analyzer for analyzing a context indicating an in-game progress based on a story line, a capacity value of a present game character and a difficulty level, an AD contents analyzer for analyzing the received AD content, an environment analyzer for analyzing an object on a screen where the AD content is displayed, and an AD copy optimizer for optimizing a copy write included in the AD content. A detailed modification method by each sub-module will be described later.

In the meantime, recognition of a context can be performed in accordance with a learning of an artificial intelligence (AI) neural network model.

Figure 2:
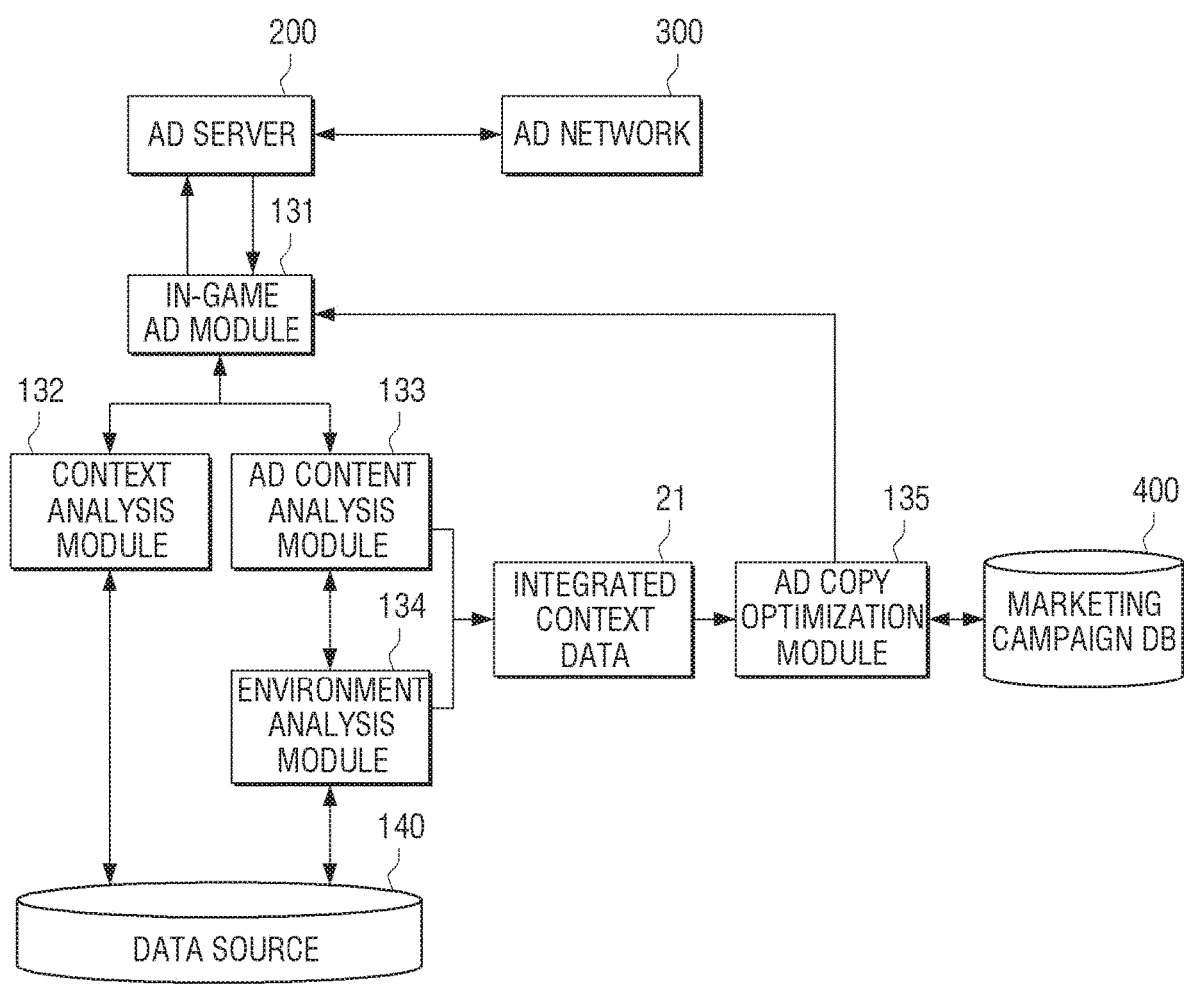
FIG. 2 is a block diagram which describes an advertisement modification system on a real-time basis according to an embodiment of the disclosure.

FIG. 2 is a block diagram which describes an advertisement modification system on a real-time basis according to an embodiment of the disclosure.

Referring to FIG. 2, an in-game AD module 131 installed in the electronic device 100 communicates with the AD server 200 through the communicator 120. Here, the AD server 200 communicates with an AD network 300 and receives the AD content tendered by the advertiser from the AD network 300.

The AD network 300 receives AD content from an advertiser through a real-time bidding system (RTB). The AD network 300 transmits the received AD content to the AD server 200, and the AD server 200 stores the received AD content for each advertiser.

The in-game AD module 131 analyzes the context in the game currently running in the electronic device 100 in real time. A context analysis module 132 serving as a sub-module included in the in-game AD module 131 analyzes a context based on data source including a story line of a game, a current game character's character level, a difficulty level, a behavior and a state of a player and the like. An AD content analysis module 133, which is another sub-module included in the in-game AD module 131, analyzes the context based on the data source such as the content and the form of the received AD content. An environment analysis module 134, which is another sub-module included in the in-game AD module 131, analyzes the context based on a data source such as in-game environment, a design tone of an object around the advertisement area, a contrast, a main texture and the like.

Based on the context analyzed by the context analysis module 132, AD contents matched to the context can be received from the AD server 200. The AD server 200 may select AD contents based on the objects (children, housewives, employees, etc.) targeted by the advertisers of AD contents received from the AD network 300 and analyzed contexts, and transmit the selected AD contents to the electronic device 100. At this time, the context which is a basis for selecting the AD content may be basic information of a game (game genre, game players' age group, player profile, etc.) or a context (current progress of a game, character level, and whether a specific event occurs, etc.) which is analyzed at a comparatively lower stage from among the analysis stages of the context.

The data source that is the basis for analyzing the context in the AD content analysis module 133 and the environment analysis module 134 may be stored in a storage (i.e., data source) 140. The storage 140 may be included in the electronic device 100. Alternatively, the storage 140 is included in a game server (i.e., marketing campaign database (DB)) 400 operated by the game developer, and the data source may be transmitted from the game server 400 to the electronic device 100 through the communicator 120.

Meanwhile, when a game developer operates the game server by itself, the game server can transmit game-related information such as the progress of the game, the story, the level of difficulty, and the configuration of each stage to the AD server 200, the in-game AD module 131 may receive this information from the AD server 200 and analyze the context.

The integrated context data 21 in which context which is analyzed in each sub-module is integrated and analyzed can be derived, and the integrated context data 21 can be input to an AD copy optimization module 135, which is another sub-module included in the in-game AD module 131, and the AD copy optimization module 135 may determine an advertisement copy to be displayed in the AD content based on the input integrated context data 21.

The AD copy optimization module 135 communicates with the AD server 200 and determines an advertisement copy to be displayed optimally in the AD content based on various copy data stored in the marketing campaign DB 20 included in the AD server 200. The advertisement copy can be determined based on the size, angle, shape, and the like of the AD content to be displayed in the area in which the advertisement is to be displayed. For example, if the AD content is equal to or less than a specific size, the advertisement copy is not viewed well to a player and thus, the AD copy optimization module 135 may insert an advertisement copy which is not long into the AD content to highlight the product image, or extend a size of the characters of the advertisement copy.

The marketing campaign DB 20 may be database which stores various copy generation history of the plurality of AD contents, which are generated based on a copy requested by the advertiser or a result of context analysis.

The AD content in which the advertisement copy is optimized is inserted in an advertisement area within a game by the in-game AD module 131 and displayed.

Figure 3:
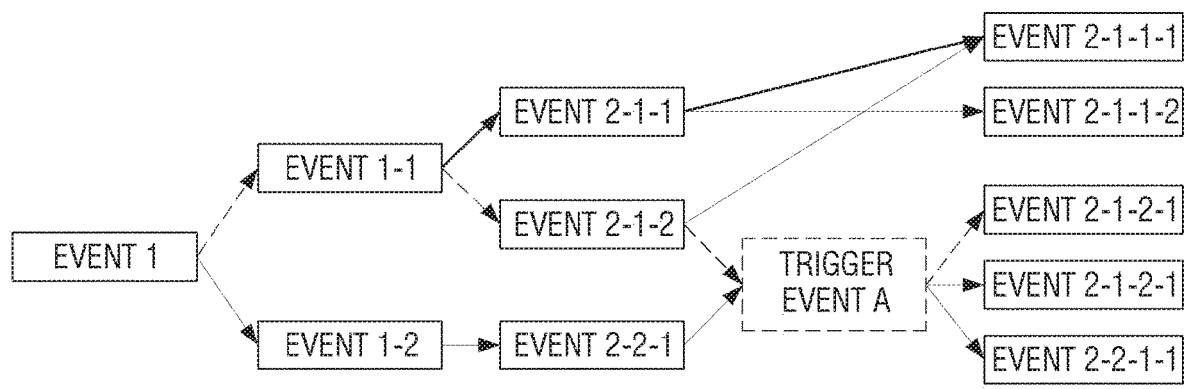
FIG. 3 is a view to describe a method for analyzing a progress in a game according to an embodiment of the disclosure.

FIG. 3 is a view to describe a method for analyzing a progress in a game according to an embodiment of the disclosure.

The processor 130 may analyze the entire in-game script to structure the progress of the story. The in-game script can be extracted from the source provided by a game company. Accordingly, the current development state of the game story can be reflected in the context.

In addition, the processor 130 may identify a milestone in the game. The processor 130 may identify a milestone indicating progress of the game by analyzing whether a trigger event occurs and a player's response to the trigger event when the game progresses. Here, the milestone may include the progress percentage (%) of the game. The trigger event may include, for example, approaching a specific non-player character (NPC) within a predetermined range to have a conversation, and an event such as removing a specific mob.

Referring to FIG. 3, the processor 130 may identify the milestone by analyzing a game progress route and required time based on an event which is completed before the trigger event A is generated when a game progresses.

In the meantime, the processor 130, by analyzing a level of difficulty, may analyze a game context. The difficulty of a game may include a designed difficulty and an undersigned difficulty.

The designed difficulty level refers to the level of difficulty which is determined based on the complexity of the map indicating a space where a character exists and a moving path, the NPC's capability value, and the frequency of appearance of the NPC, and the undesigned difficulty level is the level of difficulty that a current player realizes by calculating a balance among a level of a character, experience value, complexity of the above-mentioned map, capability value of NPC, and frequency of appearance of the NPC.

When the in-game context analysis is completed as described above, the processor 130 can automatically generate the AD content reflecting the analyzed context. Specifically, the processor 130 may identify an attribution code corresponding to the player's emotional position, based on the analyzed context and attribution model. The processor 130 may apply the properties contained in the identified attribute code to the AD content and redesign the AD content.

A method of identifying an attribute code corresponding to emotional code of the player will be further described with reference to FIGS. 4A and 4B.

Figure 4A:
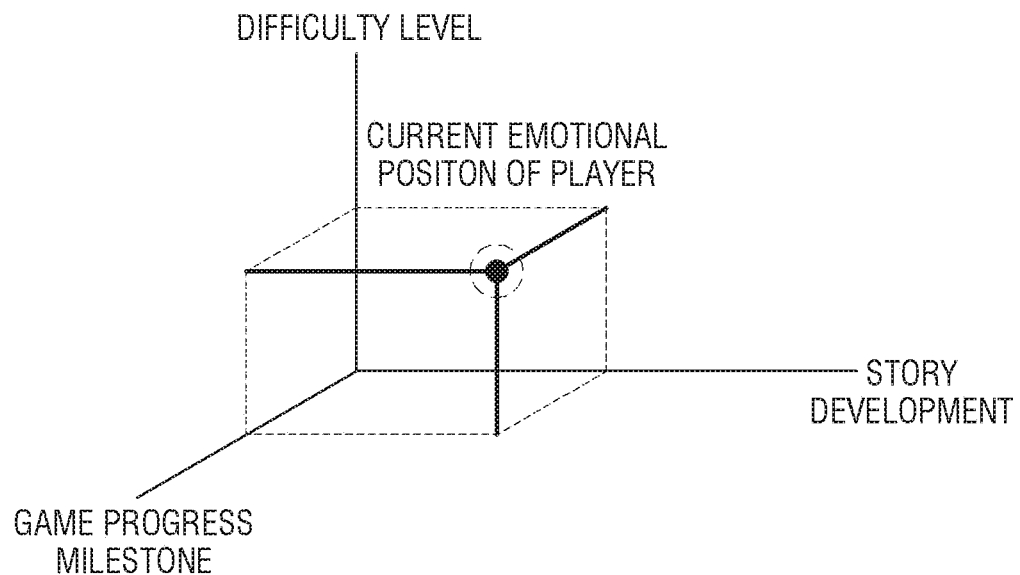
FIGS. 4A and 4B are views to describe a method for analyzing an emotional position of a player according to an embodiment of the disclosure.

FIGS. 4A and B are views to describe a method for analyzing an emotional position of a player according to an embodiment of the disclosure.

Referring to FIG. 4A, the player's emotional position can be represented by a position in the 3D space with the story development of the game, the in-game milestone, and the difficulty of the game as the x, y, and z axes, respectively. That is, the player's emotional position can be determined based on the above-described three context elements.

Figure 4B:
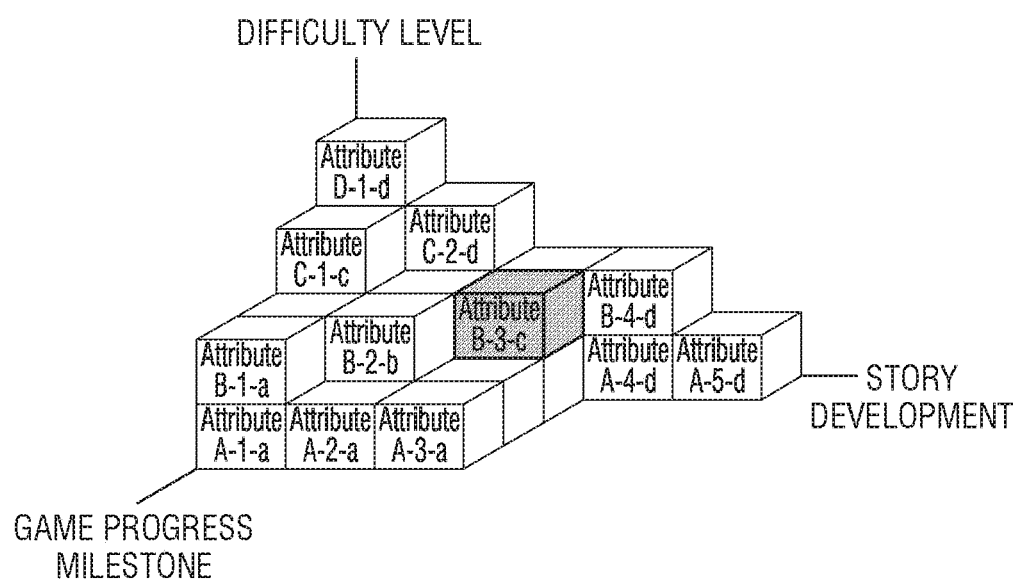

Referring to FIG. 4B, the processor 130 compares the determined emotional position of the player with the attribute model of the story development of the game, the in-game milestone and the difficulty of the game in the x, y, and z axes, respectively, and identify an attribute code corresponding to the player's emotional position. For example, the attribute code corresponding to the player's emotional position shown in FIG. 4A corresponds to B-3-*c* in the attribute model shown in FIG. 4B.

The emotional position shown in FIG. 4A may be adjusted based on the dynamic state of the current dynamic state of emotion of the player. The dynamic state of the emotion of the player means data obtained by predicting the player's current emotional state when, for example, the character defeats a boss appearing at a specific stage and clears the stage or the character is killed many times by the boss. When the character defeats the boss and clears the stage, it is predicted that the player's excitement will be elevated, and such excitement elevation state can be reflected in the player's emotional position.

The processor 130 may adjust the emotional position by reflecting the dynamic state of the predicted emotion to the emotional position.

The attribute model as illustrated in FIG. 4B may be a model included in the in-game AD module 131, and may exist by game genres. In order to control the emotional position according to the attribute model, the processor 130 may identify the attribute code using a lookup table as shown in Table 1 stored in a storage (not shown).

TABLE 1

| | Difficulty | Game progress milestone | Story development | Current dynamic state of emotion of the player | Attribute code |
|---|---|---|---|---|---|
| Emotional position | difficult | 1-5-2 bifurcation | Progress 70% | Death of a character (once) | D-4-d |
| | difficult | 1-5-2 bifurcation | Progress 70% | Death of a character (continued) | C-4-d |
| | difficult | 1-5-2 bifurcation | Progress 70% | Stage clear | A-5-d |

The processor 130 may identify the emotional position of the player using the training model based on the artificial intelligence (AI) algorithm. The trained AI model may be designed to simulate the brain structure of a human on the computer and include a plurality of network nodes which copy neuron of a human neural network and have a weight. The plurality of network nodes may form each connection relation so that neurons simulate synaptic activities of neurons which send and receive a signal through synapse. In addition, the trained AI model may include, for example, a neural network model or a deep learning model developed from a neural network model. In the deep learning model, a plurality of network nodes are located at different depths (or layers), and exchange data according to a convolution connection relationship. Examples of trained AI models include; but are not limited to, Deep Neural Network (DNN), Recurrent Neural Network (RNN), and Bidirectional Recurrent Deep Neural Network (BRDNN).

The processor 130 may identify the current emotional position of the player based on the difficulty level, the game progress milestone, the story development, and the current dynamic state of emotion using the trained AI model.

Figure 5:
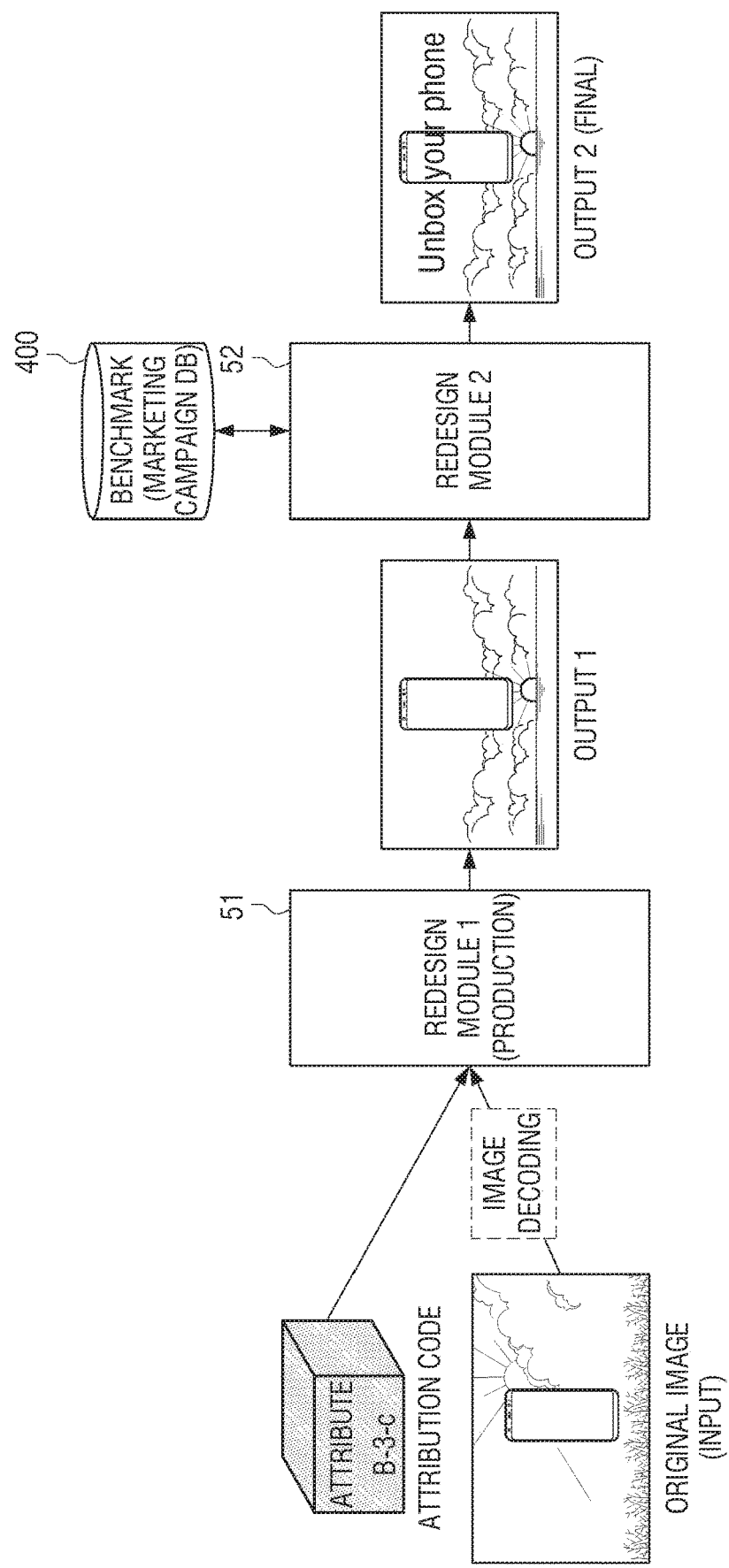
FIG. 5 is a view to describe a process for generating a modified advertisement content based on an emotional position of a player according to an embodiment of the disclosure.

FIG. 5 is a view to describe a process for generating a modified advertisement content based on an emotional position of a player according to an embodiment of the disclosure.

Referring to FIG. 5, once the attribute code is determined, the processor 130 may decode the received AD content (the original image) and redesign the AD content based on the property of the determined attribute code. Specifically, the processor 130 may generate advertisement information such as the overall background of the AD contents, objects and product images, etc., according to the property of the determined attribute code, through a redesign module 1 51, which is a sub-module of the in-game AD module, and generate a modified AD content (output 1) based on the determined advertisement element. Here, the redesign module 1 51 may correspond to the context analysis module 132, the AD content analysis module 133, and the environment analysis module 134 of FIG. 2.

The processor 130 may then generate an advertisement copy of the modified AD content (output 1) through a redesign module 2 52, which is a sub-module of the in-game AD module. The redesign module 2 52 determines an advertisement copy "Unbox your phone" to be displayed optimally in the modified AD content based on various copy data stored in the marketing campaign DB 20 included in the AD server 200, inserts the determined advertisement copy into the modified AD content (output 1), and generate the final AD content (output 2). Here, the redesign module 2 52 may correspond to the AD copy optimization module 135 in FIG. 2.

Figure 6:
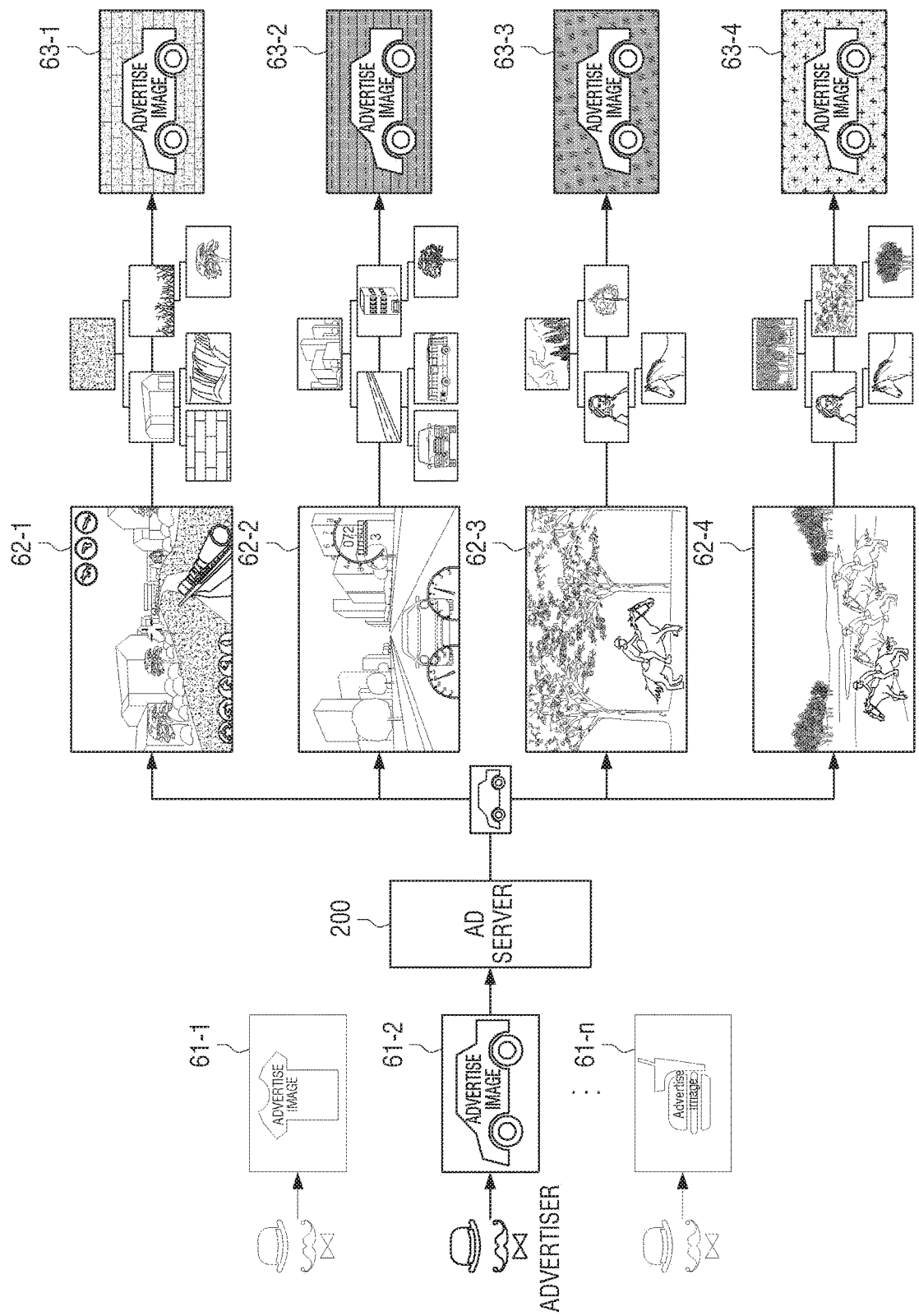
FIG. 6 is a view to describe a method for modifying an advertisement content on a real-time basis by analyzing a peripheral object around a game screen according to an embodiment of the disclosure.

FIG. 6 is a view to describe a method for modifying an advertisement content on a real-time basis by analyzing a peripheral object around a game screen according to an embodiment of the disclosure.

The processor 130, based on metadata related to an object nearby an area where the AD content is inserted on a game screen, may modify the AD content.

FIG. 6 illustrates that the AD content is transmitted to the electronic device 100, and that, according to an area where the AD content is to be inserted in a game to be running in the electronic device 100, a nearby object is reflected into the AD content.

The AD server 200 receives the AD content which is bid by the RTB system from among pre-produced AD contents 61-1, 61-2, to 61-n of a plurality of advertisers, and transmits the AD content to the electronic device 100 upon a request of the in-game AD module 131.

Referring to FIG. 6, when the AD content is received by the electronic device 100, the in-game AD module 131 analyzes the object near the area where the AD content is to be inserted in current game screens 62-1, 62-2, 62-3, and 62-4 and performs an environment object hierarchical analysis. Specifically, the in-game AD module 131 can recognize nearby objects such as a land, a house, a tree, a wall, a road, an NPC, a character, and an animal, which are objects in the vicinity of an area in which the AD content is inserted. At this time, the in-game AD module 131 may recognize a nearby object through image analysis, or recognize the nearby objects based on the metadata provided by the game server (not shown) operated by the game developer.

According to an environmental object hierarchical analysis, a hierarchical tree in which recognized peripheral objects are classified can be established. The hierarchical tree of peripheral objects can be established through game engine analysis. For example, the peripheral objects in the uppermost layer are the earth, a road, and the peripheral objects in the lower layer are a house, a tree, a building, and the peripheral objects in the further lower layer are the animals, a character, a basket, and so on.

The in-game AD module 131 reflects the characteristics of the peripheral objects in the AD content. In this process, a greater weight is given to peripheral objects in the upper layer.

Specifically, the in-game AD module 131 detects an attribute (object type, texture, color tone, and the like) of each peripheral object and generates metadata regarding a peripheral environment of an area where the AD content is to be inserted through analysis of a relationship within the hierarchical tree through priority scoring by the detected attributes. At this time, the priority scoring according to the attribute can be performed based on the distance between the peripheral object and the AD content, the number of disposed peripheral objects, and the like.

Then, the in-game AD module 131 modifies the AD content based on the metadata generated through the environmental object hierarchical analysis. The in-game Ad module can make modified AD contents 63-1, 63-2, 63-3, and 63-4 by applying a shade layer to the AD content through the light source analysis, color tone adjustment of the AD content, background combination, and the like.

In addition, the in-game AD module 131 may reflect a reference factor of peripheral objects for changing the texture attribute of the AD content. Specifically, the in-game AD module 131 may modify color, texture, and so on of the AD contents with color difference according to classification of peripheral objects, light reflection rate according to surface characteristics of the peripheral objects, a size of particles according to particle configuration of the peripheral objects, light amount by fluid (air or liquid) of the peripheral objects and a degree of reflection ratio as reference factors.

Figure 7:
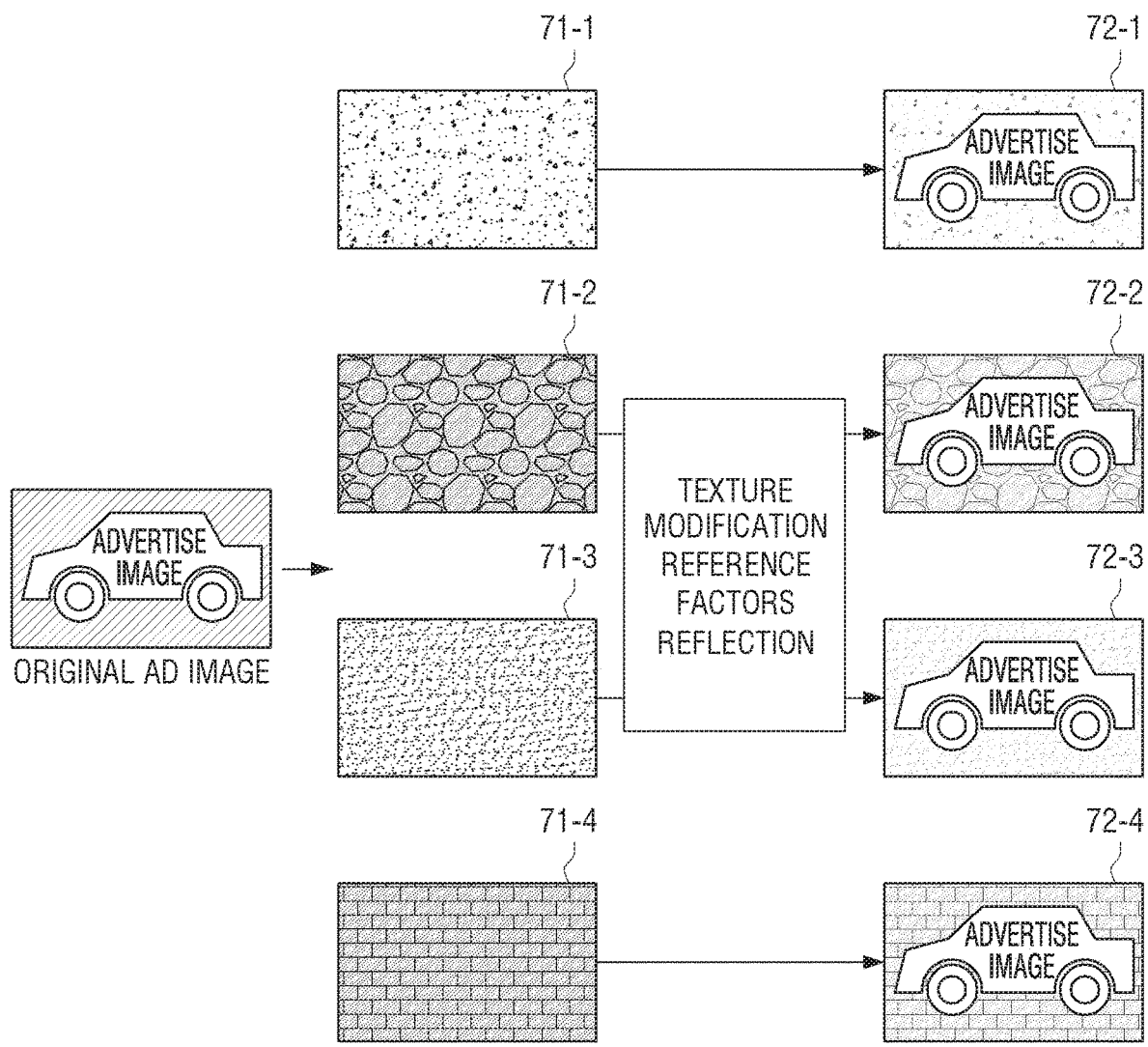
FIG. 7 is a view to describe a specific method for modifying an advertisement content based on metadata through hierarchical analysis of an environmental object according to an embodiment of the disclosure.

For example, assuming that the area in which the AD content is inserted is a building wall, the in-game AD module 131 is configured to, so that the texture of the building wall is reflected in the AD content as illustrated in FIG. 7, apply reference factors 71-1, 71-2, 71-3, and 71-4 for the pre-stored various types of wall texture (granite material, basalt material, marble material, etc.) to the AD contents to produce modified AD contents 72-1, 72-2, 72-3, and 72-4.

FIG. 7 is a view to describe a specific method for modifying an advertisement content based on metadata through hierarchical analysis of an environmental object according to an embodiment of the disclosure.

Accordingly, referring to FIG. 7, the texture of the building wall into which the AD content is inserted is reflected in the texture of the AD content, and thus, there may be an effect as if the AD content is displayed in harmony with the building wall.

Meanwhile, the in-game AD module 131 may modify the AD content using the trained model based on the AI algorithm described above. In other words, the in-game AD module 131 may use an AI model based on a neural network.

The in-game AD module 131 may identify information related to an object around the area into which the AD content is inserted and modify the AD content based on the identified information using the trained AI model.

Figure 8:
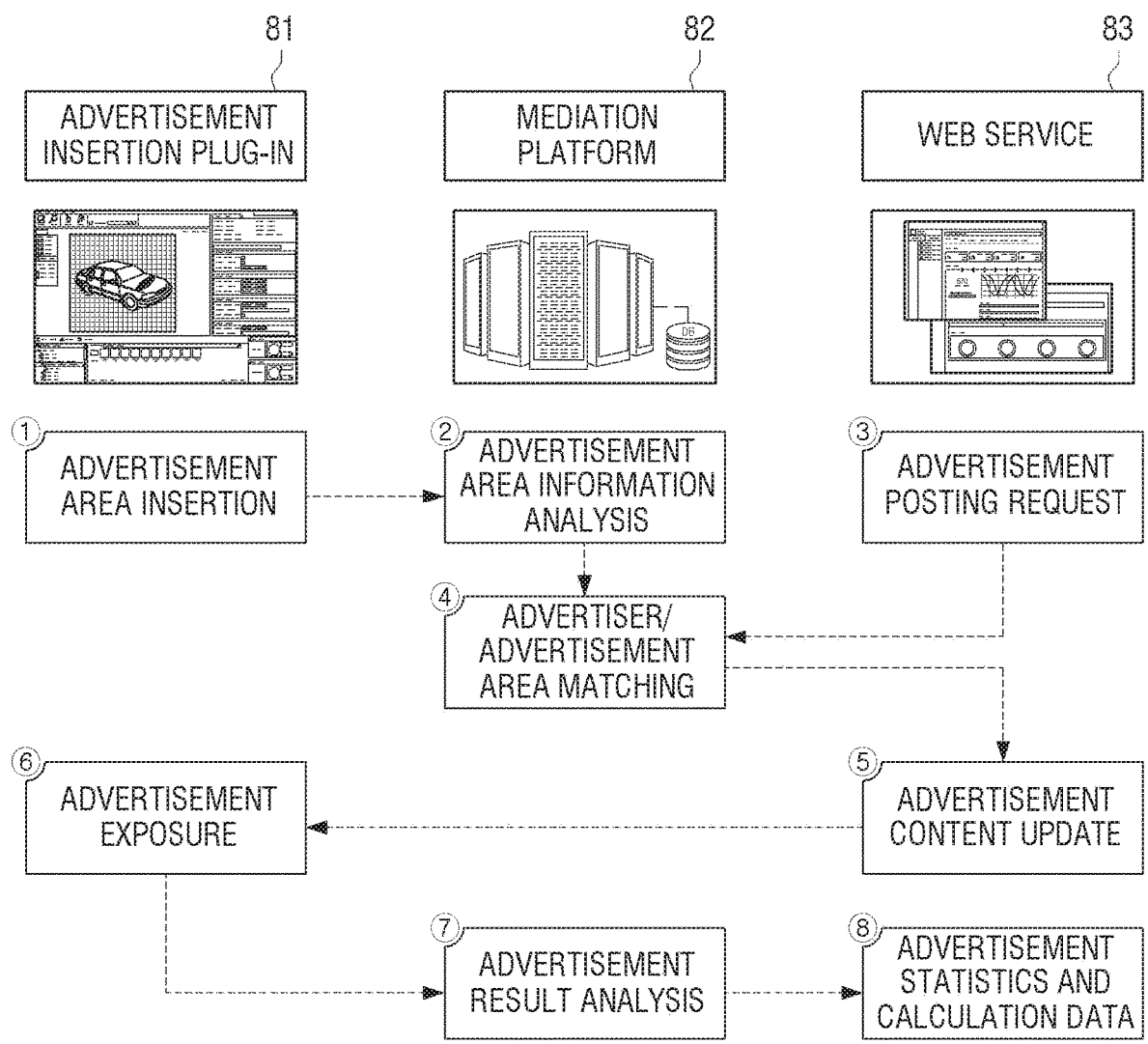
FIG. 8 is a view briefly illustrating a flowchart of a system which inserts an advertisement to a game through an advertisement provider and a mediation platform according to an embodiment of the disclosure.

FIG. 8 is a view briefly illustrating a flowchart of a system which inserts an advertisement to a game through an advertisement provider and a mediation platform according to an embodiment of the disclosure.

Referring to FIG. 8, a mediation platform 82 may provide the game developer with an advertisement insertion plug-in 81 capable of designating an area into which the AD content is to be inserted, and the game developer may designate an advertisement area wherein an advertisement is displayed within a game.

The advertisement insertion plug-in 81 inserts an advertisement where an advertisement is to be displayed, transmits information regarding an advertisement area and exposes an advertisement.

The mediation platform 82 includes the in-game AD module 131 and the AD server 200 installed in the electronic device 100. The mediation platform 82 analyzes the information of the advertisement area, matches the advertiser to the advertisement area, and feeds the modified AD content to the advertiser through a web service 83.

The AD server 200 manages the developer, the game, the advertisement area, the statistical information related to the insertion of the advertisement, and the in-game AD module 131 analyzes the game execution environment (age of the player, play time range, access area, application information, and the like) to analyze an appropriate advertisement target. The in-game AD module 131 may select an advertisement to be exposed to a player by using an advertisement matching algorithm based on the player data and design an advertisement delivery protocol in the electronic device 100.

In addition, the mediation platform 82 identifies and analyzes whether the AD content has been successfully displayed and feeds it to the AD network 300. For example, the mediation platform 82 may determine whether the AD content has been exposed using the fraud prevention algorithm of the advertisement validity check module.

The AD network 300 provides a service through a website so that an advertiser can set and search targeting information for an object for which an advertisement is to be exposed. The mediation platform 82 transmits the matching result that matches the analyzed advertisement area with the search contents of the advertiser to the AD network 300, and the AD network 300 determines the advertisement execution based on the matching result.

The in-game AD module 131 installed in the electronic device 100 analyzes a context including surrounding circumstances in terms of a space and time that the AD content is to be displayed in a designated advertisement area and an advertisement area within a currently-running game. Then, the in-game AD module 131, when a request for advertisement presentation is received from the AD network 300 through a web service for taking an order of the AD content from an advertiser, may select the AD content which best matches the advertisement area as a content to be inserted into an advertisement area, based on the analyzed context and information (advertiser or advertisement product, etc.) related to the AD content.

The in-game AD module 131 may modify and update the AD content based on the context, and then insert it into the advertisement area and display the same. In this case, the in-game AD module 131 may determine whether the AD content is appropriately exposed on the screen, analyze the advertisement result, and transmit the analyzed result to the AD network 300. Whether or not the AD content has been appropriately exposed on the screen can be determined according to the size of the AD content, the number of exposures, whether or not only a part of the content is exposed, and clicking status and so on.

The AD network 300 may calculate statistic information such as advertisement effect/purchase according to the analyzed result, and calculation data according to advertisement exposure, through the web service.

Figure 9:
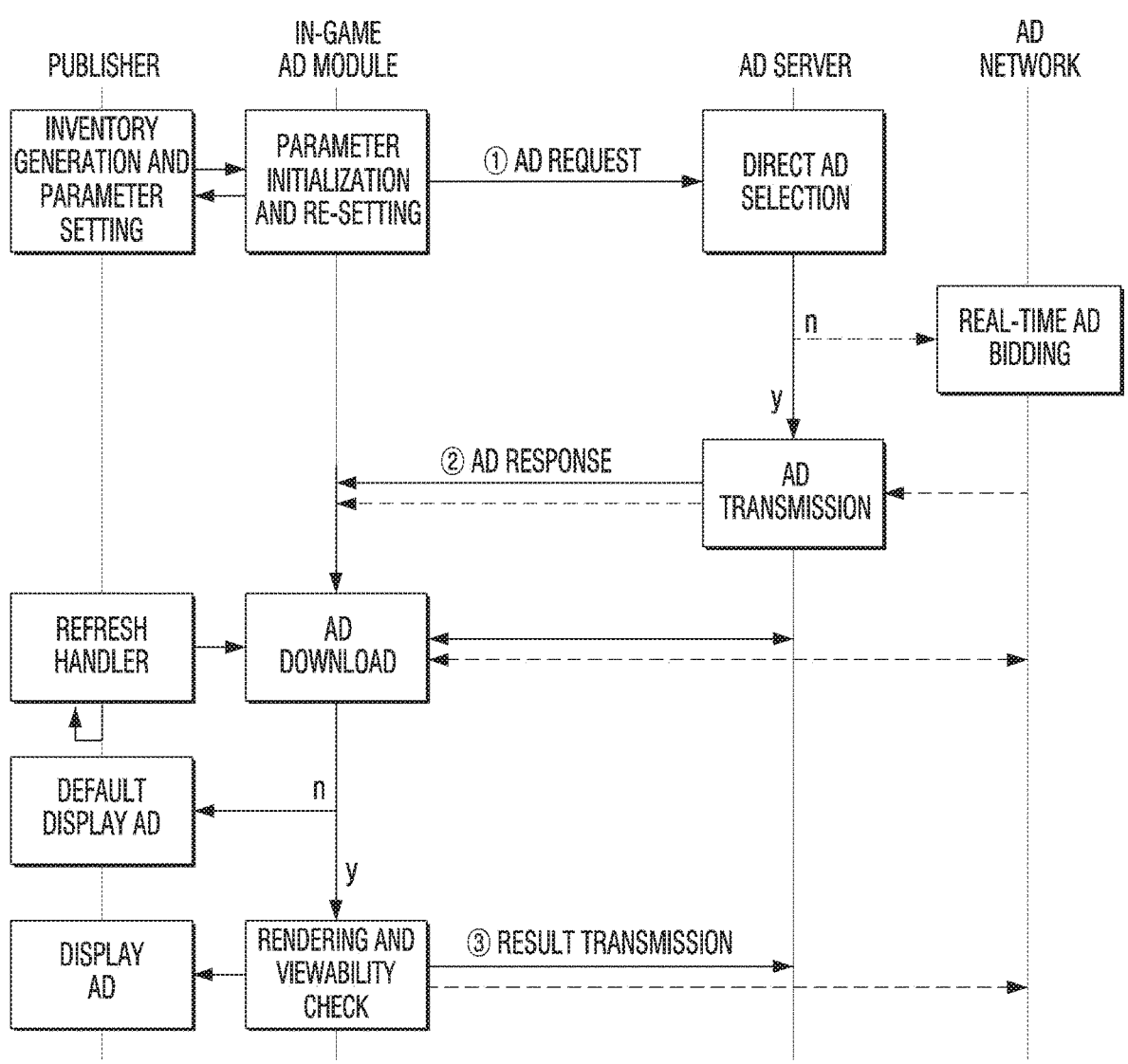
FIG. 9 is a view which illustrates a flowchart of the system of FIG. 8 in a more specific manner according to an embodiment of the disclosure.

FIG. 9 is a view which illustrates a flowchart of the system of FIG. 8 in a more specific manner according to an embodiment of the disclosure.

FIG. 9 illustrates a flow of operations among a publisher which is a game developer, the in-game AD module 131 which is a mediation platform, the AD server, 200, and the AD network 300.

Referring to FIG. 9, when the publisher generates an inventory indicating an area where an advertisement is to be inserted in a game, sets the corresponding inventory and parameter related to an environment where the inventory is present, and notifies the same to the in-game AD module 131, the in-game AD module 131 performs initialization and re-setting of parameter and requests an advertisement to the AD server 200.

The AD server 200, depending on whether a pre-stored advertisement without a bidding process would be provided or an advertisement which went through the bidding process would be provided, selects a pre-stored advertisement (direct AD), transmits the advertisement to the in-game AD module 131 as a response, and performs the real-time AD bidding through the AD network 300.

The in-game AD module 131 downloads the received AD content, renders a new AD content which has been modified from the downloaded AD content based on a context, and displays the same. If the in-game AD module 131 is not capable of downloading the AD content, a pre-stored default AD content can be displayed, and a parameter to display a new AD content through a refresh handler can be initialized and reset.

In case of the offline game, the AD content is not downloaded from the AD network 300, and the pre-stored AD content is loaded and inserted to the electronic device 100.

The in-game AD module 131 may check whether the modified AD content is appropriately displayed on a player, that is, view ability, and transmit the result to the AD network 300.

Figure 10:
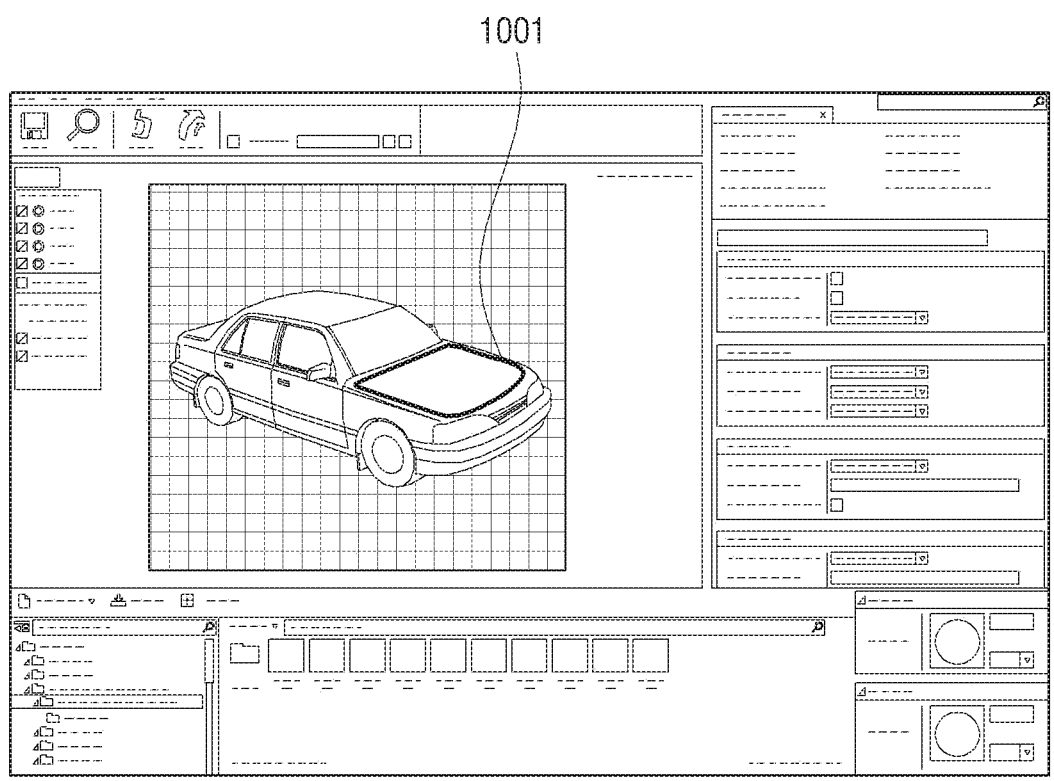
FIG. 10 is a view to describe a plug-in for designating an advertisement area according to an embodiment of the disclosure.

FIG. 10 is a view to describe a plug-in for designating an advertisement area according to an embodiment of the disclosure.

A game developer may designate an advertisement area at a game content, using an advertisement area insertion plug-in, when rendering a game content such as a 3D object in a software development kit (SDK), and after the game content is developed, information on an advertisement area can be transmitted to the mediation platform.

Referring to FIG. 10, FIG. 10 illustrates a screen for designating an advertisement area 1001 using an advertisement area insertion plug-in when the game content is rendered. The advertisement area insertion plug-in can be imported to the SDK of the package which is provided to the game developer and used.

Figure 11A:
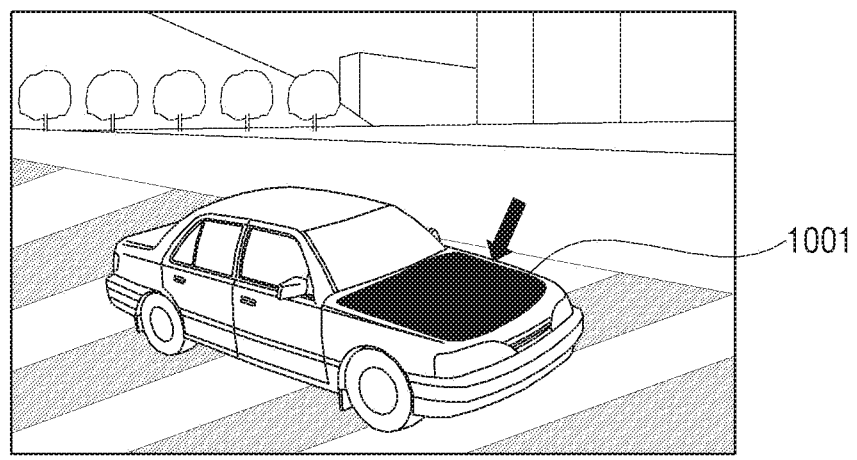
FIGS. 11A and 11B are views to illustrate a screen in which an advertisement is inserted to an advertisement area within a game according to an embodiment of the disclosure.
Figure 11B:
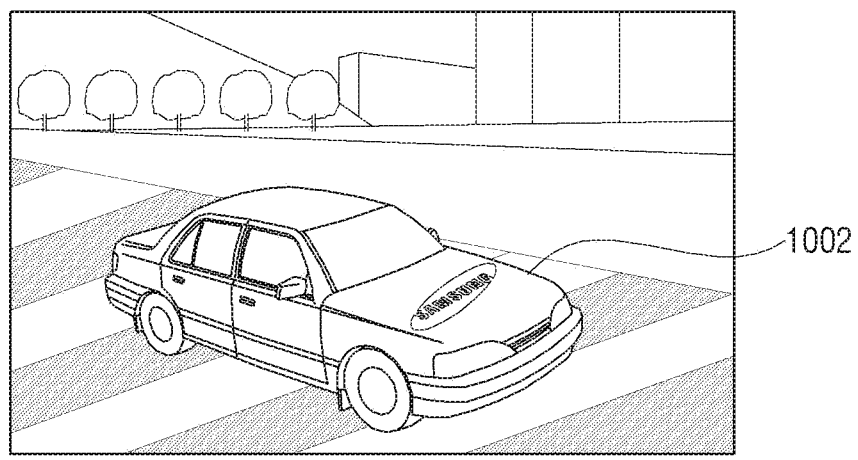

FIGS. 11A and 11B are views to illustrate a screen in which an advertisement is inserted to an advertisement area within a game according to an embodiment of the disclosure.

Accordingly, referring to FIGS. 11A and 11B, the AD content 1002 received from the AD server 200 can be inserted to the advertisement area 1001 that is designated by a player on a game screen, and displayed.

Figure 12A:
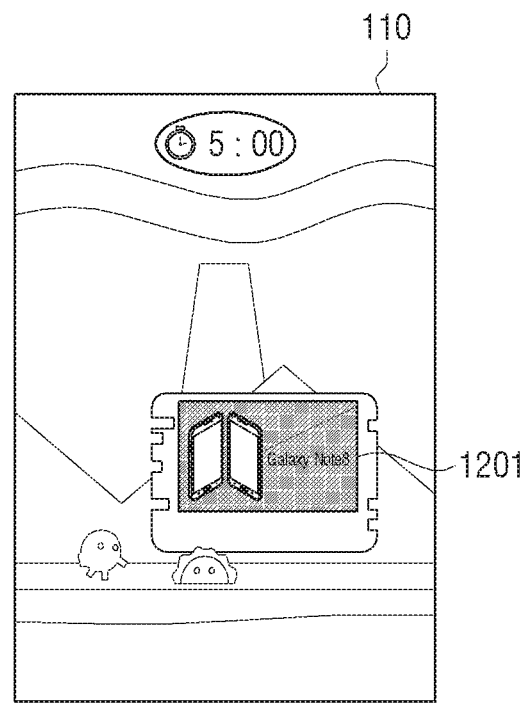
FIGS. 12A and 12B are views which illustrate a screen in which an advertisement (AD) content is displayed naturally within various game screens according to an embodiment of the disclosure.
Figure 12B:
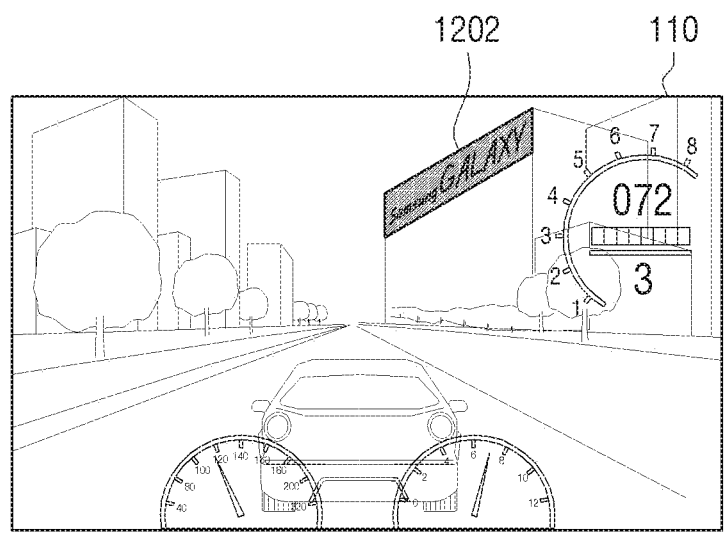

FIGS. 12A and 12B are views which illustrate a screen in which AD contents 1201, 1202 are displayed naturally within various game screens according to an embodiment of the disclosure.

Figure 13:
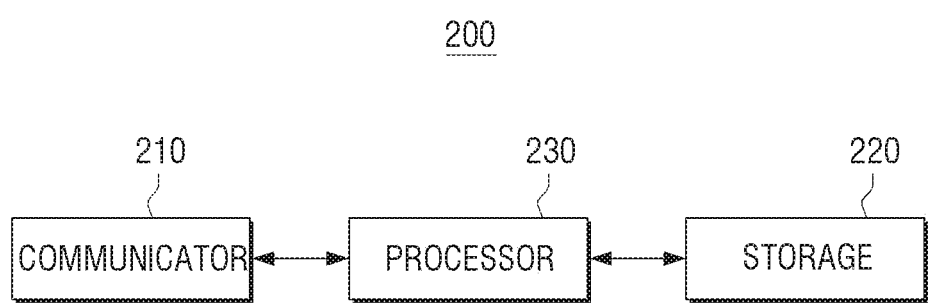
FIG. 13 is a block diagram which briefly illustrates a configuration of an embodiment according to an embodiment of the disclosure.

FIG. 13 is a block diagram which briefly illustrates a configuration of an embodiment according to another embodiment of the disclosure.

Referring to FIG. 13, an electronic device 200 includes a communicator 210, a storage 220, and a processor 230.

The electronic device 200 plays a role of mediating communication with the electronic device 100 which runs a game and the AD network 300, and is implemented as the AD server in the disclosure. Hereinafter, the electronic device 200 will be called an AD server.

The general configuration and operation of the communicator 210 are the same as those of the electronic device 100 as described in FIG. 1 and thus will not be further described. The communicator 210 receives information relating to a context in a game which is running in the electronic device 100.

The storage 220 stores a plurality of AD contents received from the AD network 300.

The processor 230 controls a general operation of the AD server (i.e., electronic device) 200, selects an AD content based on information relating to a context received through the communicator and player profile information from among the plurality of AD contents stored in the storage 220, and transmits the selected AD content to the electronic device 100.

The information relating to a context may include information regarding a game which is running in the electronic device 100 and information regarding an advertisement area in which an advertisement is to be inserted in a game.

In this processor, the processor 230 selects and AD content which is most suitable for an advertisement target based on information regarding an advertisement target designated by the advertiser from the AD network 300.

Figure 14:
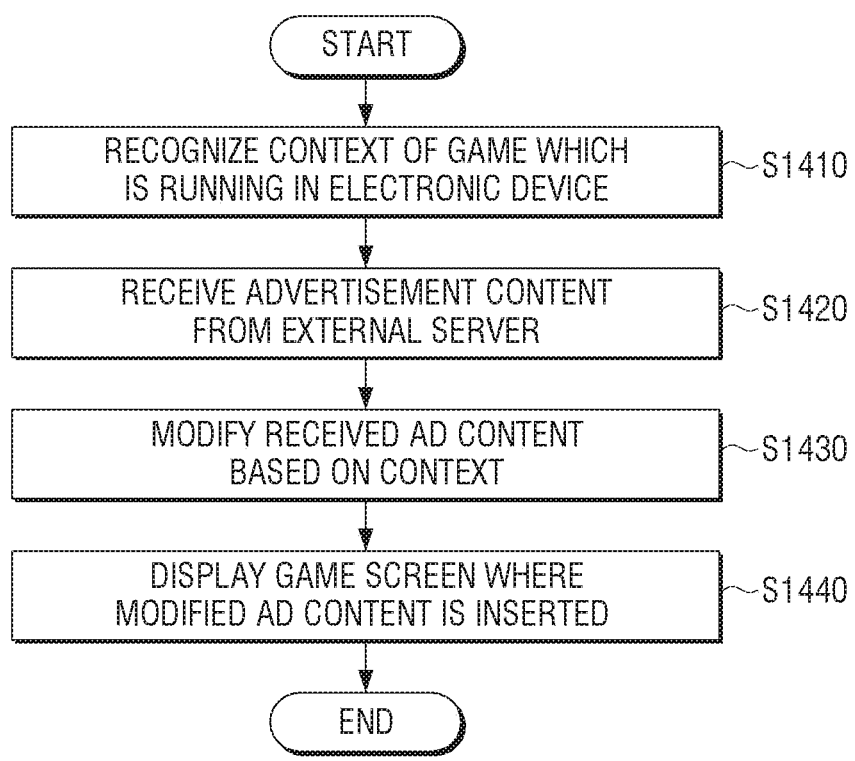
FIG. 14 is a flowchart illustrating a controlling method of an electronic device according to an embodiment of the disclosure.

FIG. 14 is a flowchart illustrating a controlling method of an electronic device according to an embodiment of the disclosure.

Referring to FIG. 14, first, a context within a game which is running in an electronic device is recognized, in operation S1410. Here, a context may include at least one of development of a story within a game, information of progress of a game, time and space information of a game, a peripheral object, player profile information, and game character profile information.

The AD content is received from an external server, in operation S1420. At this time, information regarding a context is transmitted to an external server, and an AD content which is selected based on a context can be received from the external server.

Then, based on the context, the received AD content is modified, in operation S1430. At this time, the metadata representing the context in the game is calculated through the hierarchical analysis based on the objects included in the game, and the AD content can be modified in real time based on the calculated metadata. Specifically, the object included in the game is classified to generate a hierarchical tree, the metadata representing the relationship in the hierarchical tree is calculated based on the priority of each classified object, and the AD content can be modified based on the calculated metadata.

Thereafter, the game screen in which the modified AD content is inserted is displayed in operation S1440. At this time, the modified AD content can be displayed in the form of a 3D object at a predetermined position of the layout in the game screen.

Figure 15:
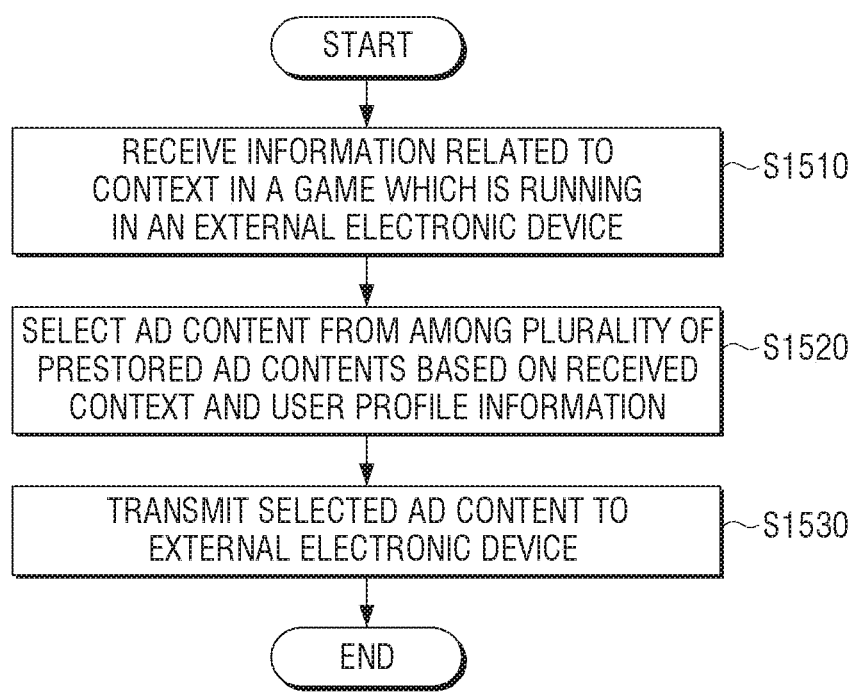
FIG. 15 is a flowchart to illustrate a controlling method of an electronic device according to an embodiment of the disclosure.

FIG. 15 is a flowchart to illustrate a controlling method of an electronic device according to an embodiment of the disclosure.

Referring to FIG. 15, first, information related to a context in a game which is running in an external electronic device is received in operation S1510. Here, the information related to the context may include information on a game which is running in an external electronic device and information on an advertisement area in which the advertisement are to be inserted in the game.

From among the pre-stored plurality of AD contents, an AD content is selected based on the received context and the player profile information, in operation S1520.

The selected AD content is transmitted to external electronic device, in operation S1530.

The control method according to the above-described various embodiments may be implemented as a program and stored in various recording media. That is, a computer program that is processed by various processors and can execute the various control methods described above may be used as a state stored in the recording medium.

For example, it is possible to provide a non-transitory computer readable medium in which a program to recognize a context in a running game, receive an AD content from an external server, modify the received AD content based on the context, and display a game screen in which the modified AD content is inserted is stored.

The non-transitory computer readable medium refers to a medium that stores data semi-permanently, and is readable by an apparatus. Specifically, the above-described various applications or programs may be stored in the non-transitory computer readable medium such as a compact disc (CD), a digital versatile disc (DVD), a hard disk, a Blu-ray' disc, a universal serial bus (USB), a memory card, a read only memory (ROM) or etc., and may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a display;
a communication circuit;
a processor; and
a memory storing instructions which, when executed by the processor, cause the processor to:
control the display to display a game screen when running a game,
receive, from an external server, advertisement content through the communication circuit,
in response to receiving the advertisement content, identify context information based on an object around an area of the game screen into which the advertisement content is to be inserted and perform environment object hierarchical analysis to classify peripheral objects in the game screen and establish a hierarchical tree in which the peripheral objects are classified,
detect at least one attribute of each peripheral object,
generate metadata regarding a peripheral environment of the area into which the advertisement content is to be inserted through analysis of a relationship with the hierarchical tree and priority scoring of the at least one attribute of each peripheral object,
based on the metadata, modify at least one of a color or a texture of the advertisement content, and
insert the modified advertisement content into the area of the game screen.

2. The electronic device of claim 1, wherein
the instructions, when executed by the processor, further cause the processor to:
control the display to display the modified advertisement content in a three-dimensional (3D) object format at a preset position in a layout of the game screen.

3. The electronic device of claim 1, wherein the context information comprises at least one of development of a story within a game, information of progress of the game, difficulty level, time and space information of the game, a peripheral object, player profile information, or game character profile information.

4. The electronic device of claim 1, wherein
the instructions, when executed by the processor, further cause the processor to:
calculate metadata representing the context information through the environment object hierarchical analysis based on an object included in the game screen, and
modify the advertisement content based on the calculated metadata.

5. The electronic device of claim 4, wherein
the instructions, when executed by the processor, further cause the processor to:
classify objects included in the game screen for generating the hierarchical tree, and
calculate metadata representing a relationship in the hierarchical tree based on a priority of each classified object.

6. The electronic device of claim 1, wherein
the instructions, when executed by the processor, further cause the processor to:
recognize a context in the game screen based on an artificial intelligence (AI) neural network model.

7. The electronic device of claim 1, wherein
the instructions, when executed by the processor, further cause the processor to:
change a characteristic of the received advertisement content by changing at least one of the color, the texture, or a size of the received advertisement content.

8. The electronic device of claim 1,
wherein the
at least one attribute includes a classification of the peripheral objects, a light reflection rate according to surface characteristics of the peripheral objects, a size of particles according to particle configuration of the peripheral objects, light amount by fluid of the peripheral objects, and a degree of reflection ratio,
wherein the priority scoring is performed based on a distance between each peripheral object and the received advertisement content and a number of peripheral objects, and
wherein the instructions, when executed by the processor, further cause the processor to:
based on the metadata, modify the at least one of the color or the texture of the received advertisement content with a color difference.

9. A controlling method of an electronic device, the controlling method comprising:
displaying a game screen when running a game;
receiving, from an external server, advertisement content;
in response to receiving the advertisement content, identifying context information based on an object around an area of the game screen into which the advertisement content is to be inserted and performing environment object hierarchical analysis to classify peripheral objects in the game screen and establish a hierarchical tree in which the peripheral objects are classified;
detecting at least one attribute of each peripheral object;
generating metadata regarding a peripheral environment of the area into which the advertisement content is to be inserted through analysis of a relationship with the hierarchical tree and priority scoring of the at least one attribute of each peripheral object;
based on the metadata, modifying at least one of a color or a texture of the advertisement content; and
inserting the modified advertisement content into the area of the game screen.

10. The controlling method of claim 9, wherein the displaying comprises displaying the modified advertisement content in a three-dimensional (3D) object format at a preset position in a layout of the game screen.

11. The controlling method of claim 9, wherein the context information comprises at least one of development of a story within a game, information of progress of the game, difficulty level, time and space information of the game, a peripheral object, player profile information, or game character profile information.

12. The controlling method of claim 9, wherein the modifying of the received advertisement content comprises:
calculating metadata representing the context information in the game screen through the environment object hierarchical analysis based on an object included in the game screen; and modifying the advertisement content based on the calculated metadata in real time.

13. The controlling method of claim 12, wherein the modifying of the received advertisement content comprises:
classifying the object included in the game screen for generating the hierarchical tree; and
calculating metadata representing a relationship in the hierarchical tree based on a priority of each classified object.

14. The controlling method of claim 9, wherein the identifying of the context information comprises:
identifying a context in the game screen based on an artificial intelligence (AI) neural network model.

15. A system comprising:
a first electronic device; and
a second electronic device,
wherein the first electronic device comprises a first memory storing instructions which, when executed by a first processor of the first electronic device, cause the first processor to:
display a game screen when running a game,
receive, from the second electronic device, advertisement content,
in response to receiving the advertisement content, identify context information based on an object around an area of the game screen into which the advertisement content is to be inserted and perform environment object hierarchical analysis to classify peripheral objects in the game screen and establish a hierarchical tree in which the peripheral objects are classified,
detect at least one attribute of each peripheral object,
generate metadata regarding a peripheral environment of the area into which the advertisement content is to be inserted through analysis of a relationship with the hierarchical tree and priority scoring of the at least one attribute of each peripheral object,
based on the metadata, modify at least one of a color or a texture of the advertisement content, and
insert the modified advertisement content into the area of the game screen, and
wherein the second electronic device comprises a second memory storing instructions which, when executed by a second processor of the second electronic device, cause the second processor to:
receive the context information from the first electronic device,
based on the context information and player profile information, select the advertisement content from among a plurality of pre-stored advertisement contents, and
transmit the advertisement content to the first electronic device.

16. A non-transitory recordable medium in which a program for executing a controlling method of an electronic device is stored,
wherein the controlling method comprises:
displaying a game screen when running a game;
receiving, from an external server, advertisement content;
in response to receiving the advertisement content, identifying context information based on an object around an area of the game screen into which the advertisement content is to be inserted and performing environment object hierarchical analysis to classify peripheral objects in the game screen and establish a hierarchical tree in which the peripheral objects are classified;
detecting at least one attribute of each peripheral object;
generating metadata regarding a peripheral environment of the area into which the advertisement content is to be inserted through analysis of a relationship with the hierarchical tree and priority scoring of the at least one attribute of each peripheral object;
based on the metadata, modifying at least one of a color or a texture of the advertisement content; and
inserting the modified advertisement content into the area of the game screen.

* * * * *